(12) United States Patent
Houwing et al.

(10) Patent No.: US 12,552,099 B2
(45) Date of Patent: Feb. 17, 2026

(54) ADDITIVE MANUFACTURING SYSTEM WITH A SEALED BUILD CHAMBER

(71) Applicant: ULTIMAKER B.V., Geldermalsen (NL)

(72) Inventors: Raymond Houwing, Geldermalsen (NL); Kornelis Hermanus Welling, Geldermalsen (NL)

(73) Assignee: ULTIMAKER B.V., Zaltbommel (NL)

( * ) Notice: Subject to any disclaimer, the term of this patent is extended or adjusted under 35 U.S.C. 154(b) by 325 days.

(21) Appl. No.: 18/546,433

(22) PCT Filed: Mar. 29, 2022

(86) PCT No.: PCT/NL2022/050169
§ 371 (c)(1),
(2) Date: Aug. 15, 2023

(87) PCT Pub. No.: WO2022/211621
PCT Pub. Date: Oct. 6, 2022

(65) Prior Publication Data
US 2024/0131786 A1 Apr. 25, 2024
US 2024/0227289 A9 Jul. 11, 2024

(30) Foreign Application Priority Data
Mar. 29, 2021 (NL) .................................. 2027860

(51) Int. Cl.
*B29C 64/236* (2017.01)
*B29C 64/118* (2017.01)
*B29C 64/205* (2017.01)
*B29C 64/25* (2017.01)
*B33Y 30/00* (2015.01)

(52) U.S. Cl.
CPC .......... *B29C 64/236* (2017.08); *B29C 64/205* (2017.08); *B29C 64/25* (2017.08); *B33Y 30/00* (2014.12); *B29C 64/118* (2017.08)

(58) Field of Classification Search
CPC ..... B29C 64/236; B29C 64/205; B29C 64/25; B29C 64/118; B33Y 30/00
See application file for complete search history.

(56) References Cited

U.S. PATENT DOCUMENTS 6,722,872 B1 * 4/2004 Swanson ............... B29C 64/112
425/375
7,625,198 B2 * 12/2009 Lipson ................... A61L 27/54
425/375

(Continued)

*Primary Examiner* — Galen H Hauth
*Assistant Examiner* — John Robitaille
(74) *Attorney, Agent, or Firm* — Ipsilon USA—NLO

(57) ABSTRACT

Provided herein is an additive manufacturing system having a build chamber, a plurality of tools and a plurality of tool bays where each tool bay is arranged to store one tool. A gantry is arranged to select one tool and removes the selected tool from a tool bay. A tool mount is slidably arranged on the gantry and to detachably couple the selected tool to the gantry. Two guide rails extend in a first direction and are arranged to receive the selected tool. The guide rails are movable along a second direction perpendicular to the first direction, so as to enable alignment of the guide rails with one of the tool bays at a time. Channel seals expand or contract based on a relative movement between the tools and the sliders.

10 Claims, 11 Drawing Sheets

(56) References Cited

U.S. PATENT DOCUMENTS

| | | | | |
|---|---|---|---|---|
| 8,926,484 B1* | 1/2015 | Comb | ................... | B23Q 3/155 |
| | | | | 425/162 |
| 9,358,728 B1* | 6/2016 | Chang | ................... | B29C 64/236 |
| 9,688,022 B2* | 6/2017 | Chang | ................... | B29C 64/147 |
| 10,464,178 B1* | 11/2019 | Steeb | ...................... | B23Q 1/015 |
| 2010/0327479 A1* | 12/2010 | Zinniel | ................. | B29C 64/106 |
| | | | | 425/114 |
| 2012/0068378 A1* | 3/2012 | Swanson | ............... | B29C 64/118 |
| | | | | 264/308 |
| 2013/0078073 A1* | 3/2013 | Comb | ................... | B33Y 40/00 |
| | | | | 414/800 |
| 2014/0363532 A1* | 12/2014 | Wolfgram | ............. | B29C 64/236 |
| | | | | 425/113 |
| 2019/0210284 A1 | 7/2019 | Bosveld | | |
| 2019/0322048 A1 | 10/2019 | Huitema et al. | | |

* cited by examiner

ADDITIVE MANUFACTURING SYSTEM
WITH A SEALED BUILD CHAMBER

FIELD OF THE INVENTION

The present invention relates to an additive manufacturing system comprising a sealing assembly for sealing a build chamber, and a number of tool bays for storing tools.

BACKGROUND ART

Additive manufacturing systems are widely known for three-dimensional printing of objects/parts. Some additive manufacturing systems may typically include multiple tools that are independently controlled to perform one or more functions including, but not limited to, cooling, heating, milling, deburring, extruding, inspection, assembly operations, and the like. Each of the tools may be parked in a tool bay. Such additive manufacturing systems may typically include a gantry for selectively coupling with the tool to allow the tool to perform the one or more intended functions.

Some operations performed on the additive manufacturing systems may typically involve controlled environments for producing parts or components. For example, a portion of the additive manufacturing system may be sealed to obtain an enclosed space. However, this may cause problems in selecting tools from the tool bays that are typically disposed outside the controlled environment. For example, individual tools may need to be lifted out of the controlled environment for exchange with the tools from the tool bays. Consequently, the controlled environment may not be maintained during an operational cycle of the additive manufacturing system since the tool needs to be moved out of the controlled environment.

SUMMARY OF THE INVENTION

The aim of the present invention is to provide a new and improved additive manufacturing system that allows exchange of tools while allowing a controlled environment to be maintained inside the additive manufacturing system.

According to a first aspect of the present invention, there is provided an additive manufacturing system comprising a housing, a build chamber and a plurality of tools. The additive manufacturing system further comprises a plurality of tool bays associated with the plurality of tools. Each tool bay is arranged to store one tool from the plurality of tools. The additive manufacturing system further comprises a gantry arranged to select one tool from the plurality of tools. The gantry removes the selected tool from the associated tool bay and moves the selected tool in a plane above the build chamber. The additive manufacturing system further comprises a tool mount slidably arranged on the gantry. The tool mount is arranged to detachably couple the selected tool to the gantry.

The additive manufacturing system further comprises two parallel guide rails extending in a first direction and defining a channel therebetween. The guide rails are arranged to at least partially and slidably receive the selected tool from one of the tool bays. The two guide rails are movable along a second direction perpendicular to the first direction, so as to enable alignment of the guide rails with one of the tool bays at a time.

The additive manufacturing system further comprises a sealing assembly for sealing the build chamber at a top of the build chamber. The sealing assembly comprises a plurality of sliders each being slidably arranged in one of the tool bays and a plurality of first channel seals. Each first channel seal is arranged between one of the tools and one of the sliders. Each first channel seal expands or contracts based on a relative movement between the associated tool and the associated slider. In case the selected tool is moved back to the associated tool bay by the gantry, the selected tool moves the associated slider into the associated tool bay together with the associated first channel seal. The sealing assembly also comprises a first side seal arranged between the housing and the first guide rail, and a second side seal arranged between the housing and the second guide rail.

The gantry may select one tool from the plurality of tools and slidably remove the selected tool from the associated tool bay. Further, the gantry may move the selected tool in the plane above the build chamber for operational purposes. As the tool is removed from the associated tool bay, the associated slider will also be removed out of the tool bay since it is detachably coupled to the tool. The first channel seal may expand or contract based on the relative movement between the associated tool and the associated slider. In an expanded state, the first channel seal will at least partially seal the build chamber at the top.

Since a first channel seal is provided for each tool, the channel between the guide rails at a tool bay side will be sealed if a tool is taken out of a tool bay. Together with other additional seals arranged at the top of the build chamber, the build chamber can be fully, or at least substantially, sealed at the top so as to avoid heat or gasses escaping from the build chamber.

The invention provides for an at least substantially sealed build chamber of an additive manufacturing system having a tool changing system without the need to lift the tools out of the build chamber. In the additive manufacturing system, the tools move in the plane above the build chamber and each time a tool is taken out of its tool bay, part of the channel is sealed by a first channel seal. The sealing is also maintained during the exchange of tools since each tool is followed by an associated first channel seal which follows and expands as the associated tool is selected and removed from the associated tool bay, thereby sealing at least a part of the build chamber.

In an embodiment, at least one of the first channel seals comprises expandable bellows. This may allow the first channel seal to expand and collapse based on the relative movement of the associated tool and the associated slider.

In an embodiment, the tool mount comprises a push body arranged between and in contact with the first guide rail and the second guide rail, such that a movement of the tool mount in the second direction causes a corresponding movement of each of the first guide rail and the second guide rail in the second direction. Since the push body is coupled to the first guide rail and the second guide rail, the push body may enable corresponding movements of the first guide rail and the second guide rail due to the movement of the tool mount in the second direction.

In an embodiment, the additive manufacturing system further comprises a guide rod extending along the second direction. The additive manufacturing system further comprises a guide rail support coupled to each of the first guide rail and the second guide rail, and slidably coupled to the guide rod. Since the guide rail support is slidably coupled to the guide rod, the guide rail support may allow movement of each of the first guide rail and the second guide rail relative to the guide rod.

In an embodiment, a distance between the first guide rail and the second guide rail is such that the first guide rail and the second guide rail are arranged to be aligned with a pair of grooves in each of the tool bays, and the associated slider is arranged to slide in and out of the associated tool bay. This may allow the first guide rail and the second guide rail to slidably receive the selected tool and the associated slider therebetween.

In an embodiment, the additive manufacturing system further comprises a plurality of seal holders each being arranged to hold one of the first channel seals. Each seal holder comprises a first seal holder part and a second seal holder part detachably coupled to the first seal holder part. Each first channel seal is arranged in an associated seal holder from the plurality of seal holders. The first seal holder part is coupled to the associated tool. The second seal holder part functions as the slider. The seal holder may comprise a substantially rectangular framework arranged around the first channel seal and comprising two detachable parts.

In an embodiment, the second seal holder part is detachably coupled to the first seal holder part via a magnetic coupling. The magnetic coupling may hold the first seal holder part and the second seal holder part together so that the second seal holder part (i.e., the slider) will also move out of the tool bay when the associated tool is removed from the associated tool bay.

In an embodiment, the first guide rail comprises a first stopper and the second guide rail comprises a second stopper. The first and second stoppers are disposed adjacent to the plurality of tool bays. The first and second stoppers are arranged to allow the first seal holder part to pass therebetween while restricting the movement of the second seal holder part therebetween, such that when the tool together with the first seal holder part moves away from the tool bay, the first seal holder part uncouples from the second seal holder part to allow the first channel seal to expand and cover at least a part of the build chamber.

In an embodiment, the second seal holder part comprises a first resilient member and a second resilient member inclined inwardly towards each other relative to the first and second guide rails. A first protrusion extends from the first resilient member and a second protrusion extends from the second resilient member. The first stopper of the first guide rail comprises a first wedge member and the second stopper of the second guide rail comprises a second wedge member inclined inwardly towards each other relative to the first and second guide rails. The first wedge member comprises a first aperture and the second wedge member comprises a second aperture. The first wedge member is configured to engage with the first resilient member and the second wedge member is configured to engage with the second resilient member. The first aperture is configured to removably and at least partially receive the first protrusion therein to detachably couple the second seal holder part to the first guide rail. The second aperture is configured to removably and at least partially receive the second protrusion therein to detachably couple the second seal holder part to the second guide rail. Since the second seal holder part can detachably couple to the first guide rail and the second guide rail, the first seal holder part may uncouple with the second seal holder part as the first seal holder part moves away from the tool bay, thereby allowing the first channel seal to expand caused by the separation between the associated tool and the associated slider.

In an embodiment, the additive manufacturing system further comprises a plurality of bay seals. Each bay seal is arranged between one of the sliders and a frame of the associated tool bay. Each bay seal expands or contracts based on a movement of the associated slider relative to the associated tool bay. Each bay seal at least partially seals the build chamber. Specifically, after the selected tool is removed by the gantry, the associated bay seal may at least partially seal the build chamber at a location where the selected tool is usually stored in the tool bay, thereby maintaining sealing of the build chamber.

BRIEF DESCRIPTION OF THE DRAWINGS

These and other aspects of the invention are apparent from and will be elucidated with reference to the embodiments described hereinafter. In the drawings, FIG. 1 schematically shows a perspective view of an additive manufacturing system according to an embodiment of the present invention.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
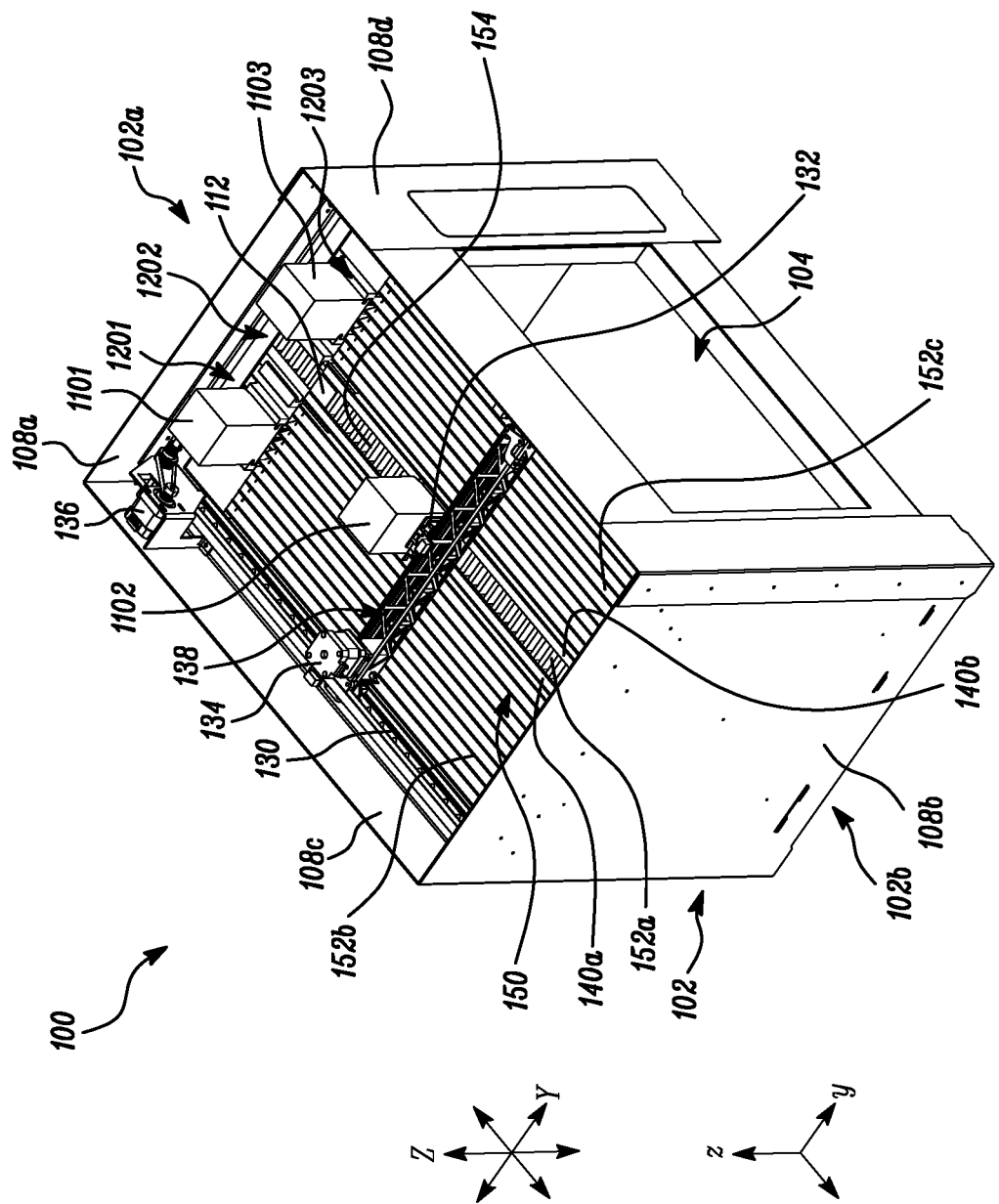

FIG. 1 schematically shows a perspective view of an embodiment of an additive manufacturing system 100. The additive manufacturing system 100 is arranged to build or print a 3D (three-dimensional) object/part using an extrusion-based 3D printing technique, such as fused filament fabrication (FFF).

The additive manufacturing system 100 comprises a housing 102. In this example, the housing 102 extends in an X-direction, a Y-direction and a Z-direction as indicated by x, y, and z arrows, respectively, in the drawing. The housing 102 may be a structural component of the additive manufacturing system 100 and may comprise multiple structural sub-components, such as support frames, housing walls, and the like. The additive manufacturing system 100 further comprises a build chamber 104. The housing 102 encloses the build chamber 104 at least from the bottom and the four sides. In this example, the housing 102 has a rectangular-shaped cross section in an X-Y plane defined by the X and Y directions. In FIG. 1, a first end 102a and a second end 102b opposite to the first end 102a of the housing 102 are indicated. In this example, the housing 102 comprises a first wall 108a at the first end 102a, a second wall 108b at the second end 102b, a third wall 108c extending between the first wall 108a and the second wall 108b, and a fourth wall 108d opposite to the third wall 108c and extending between the first wall 108a and the second wall 108b. The third wall 108c may be referred to as a back wall and the fourth wall 108d may be referred to as a front wall. It is noted that a front wall 108d in this example is partly open, but the shown opening can be closed by means of a door which is not shown here.

The build chamber 104 may be an enclosed chamber for conducting 3D printing operations. In some embodiments, the build chamber 104 may receive heated air (or other gases or liquids) to maintain elevated temperatures. For example, the build chamber 104 may be heated to reduce a rate at which the 3D objects/parts may solidify after being extruded and deposited (e.g., to reduce distortions and curling).

The additive manufacturing system 100 of FIG. 1 further comprises a plurality of tools. In the illustrated embodiment of FIG. 1, only three tools 1101, 1102, 1103 are shown. However, the additive manufacturing system 100 may comprise any number of tools, of course being limited to the space available. In some embodiments, the plurality of tools 1101, 1102, 1103 may be disposed within the housing 102. The plurality of tools 1101, 1102, 1103 may perform a variety of functions, including, but not limited to, extruding print material, cooling, heating, milling, deburring, object inspection, assembly operations.

Some or all of the tools 1101, 1102, 1103 may be configured to dispense one or more materials within the build chamber 104. In some embodiments, the tool 1101, 1102, 1103 may comprise nozzles (not shown in FIG. 1) through which a thermoplastic material (e.g., a polymer) may be extruded. In some embodiments, the tools 1101, 1102, 1103 may comprise one or more extruders (not shown) that may receive a consumable material (e.g., a filament). The consumable material may be melted by the one or more extruders and the molten consumable material may then be utilized to produce the 3D objects/parts.

The additive manufacturing system 100 of FIG. 1 further comprises a plurality of tool bays associated with the plurality of tools. In this example, the additive manufacturing system 100 comprises three tool bays 1201, 1202, 1203. Each tool bay 1201, 1202, 1203 is arranged to store one of the tools 1101, 1102, 1103. In the illustrated embodiment of FIG. 1, the tool bays 1201, 1202, 1203 are disposed next to each other and at or proximal to the first end 102a of the housing 102. Each of the tool bays 1201, 1202, 1203 may comprise rails or grooves or guides configured to slidably and removably receive one of the tools 1101, 1102, 1103 therein.

Figure 2:
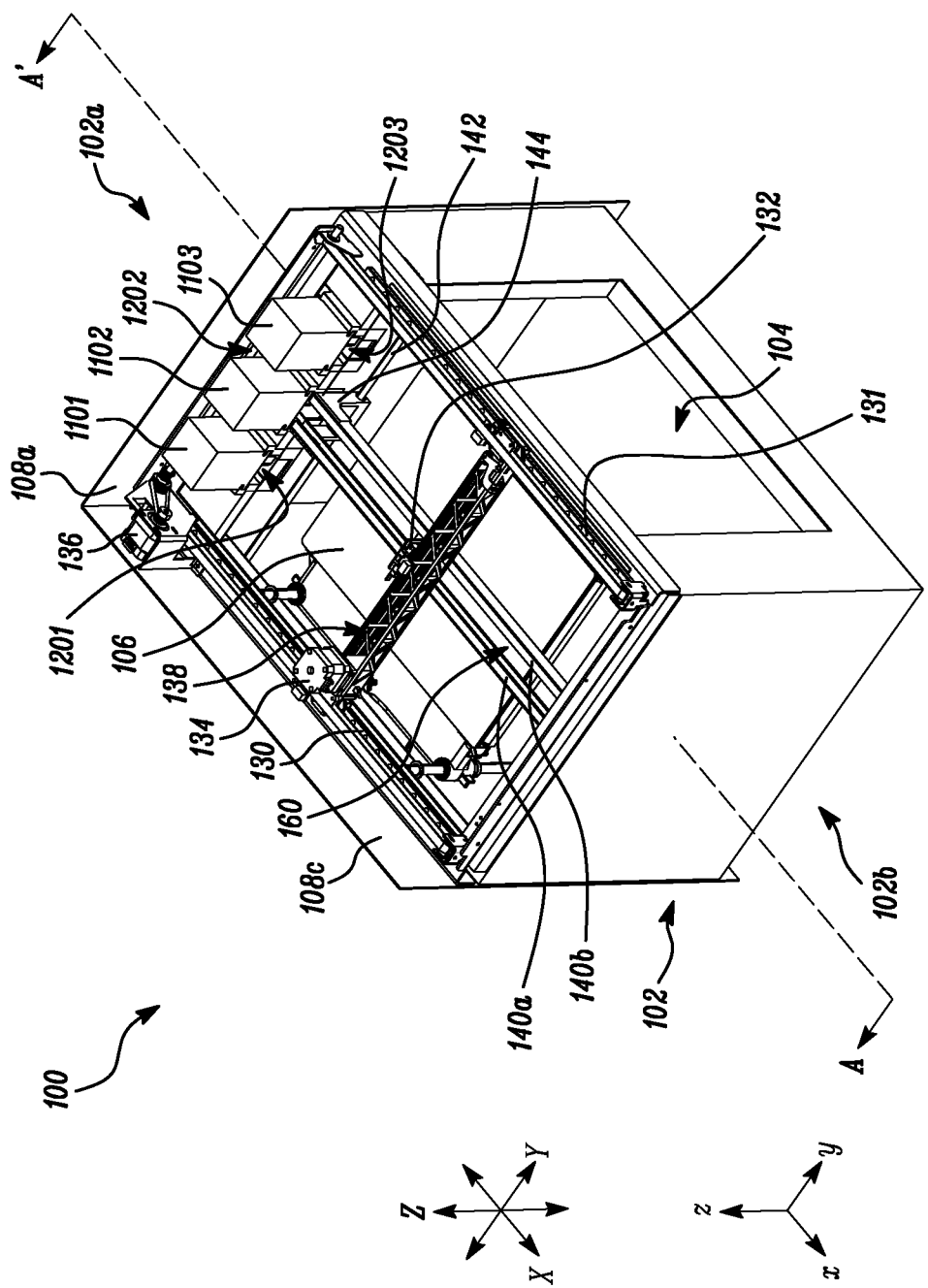
FIG. 2 schematically shows a perspective view of the additive manufacturing system of FIG. 1 with some elements removed.

The additive manufacturing system 100 further comprises a gantry arranged to select one of the tools 1101, 1102, 1103. The gantry comprises two parallel gantry rails 130, 131 (gantry rail 131 is shown in FIG. 2) and a bridge 138, also referred to as cross-beam 138. In the illustrated embodiment, the gantry has taken the tool 1102 out of the tool bay 1202. For the purpose of description, the tool 1102 picked out of its tool bay will be referred to as the "selected" tool 1102. The cross-beam 138 is slidably supported by the gantry rails 130, 131 within the housing 102 to allow movement of the cross-beam 138 along the X-direction.

The additive manufacturing system 100 further comprises a tool mount 132 slidably arranged on the cross-beam 138. In this example, the tool mount 132 is arranged to be movable relative to the cross-beam 138 along the Y-direction. The tool mount 132 is arranged to detachably couple the selected tool 1102 to the cross-beam 138 of the gantry. The tool mount 132 may comprise suitable coupling arrangements for detachably coupling the selected tool 1102 with the tool mount 132, thereby, retaining the selected tool 1102 therewith.

The gantry is arranged to remove the selected tool 1102 from the associated tool bay 1202 and move the selected tool 1102 in a plane above the build chamber 104. Specifically, the tool mount 132 is arranged to detachably couple with the selected tool 1102 allowing the gantry to move the selected tool 1102 in the plane above the build chamber 104. In some embodiments, the plane in the which the selected tools move may be substantially disposed along the X-Y plane. The tools 1101, 1102, 1103 may be selected based on a type of operation to be performed during an operational cycle of the additive manufacturing system 100. For example, if all or some of the tools are extruder heads arranged to deposit an extrudable material, those tools may be selected depending on the materials fed into the tools.

In the embodiment of FIG. 1, the additive manufacturing system 100 further comprises a first motor 134 drivably coupled to the tool mount 132 and a second motor 136 drivably coupled to the cross-beam 138. The first motor 134 enables movement of the tool mount 132 along the Y-direction relative to the cross-beam 138 and the second motor 136 enables movement of the cross-beam 138 along the X-direction. In some embodiments, each of the first and second motors 134, 136 comprises a stepper motor or an encoded DC motor. The additive manufacturing system 100 further comprises one or more gears, pulleys, belts, screws, and/or the like for drivably coupling the first motor 134 and the second motor 136 with the tool mount 132 and the cross-beam 138, respectively.

The additive manufacturing system 100 further comprises two parallel guide rails (a first guide rail 140a and a second guide rail 140b), see also FIG. 2 where the first and second guide rails 140a, 140b are better visible. Each of the first guide rail 140a and the second guide rail 140b extends in a first direction X and are movable at least along a second direction Y perpendicular to the first direction X, as will be discussed in more detail below with reference to FIG. 2.

The additive manufacturing system 100 comprises a sealing assembly 150 for sealing the build chamber 104 at a top of the build chamber 104. Specifically, the sealing assembly 150 is arranged to seal the housing 102 above the build chamber 104.

The sealing assembly 150 comprises a plurality of first channel seals 154 and a plurality of sliders 112. Specifically, each first channel seal 154 is arranged between one of the tools 1101, 112, 1103 and one of the sliders 112. In FIG. 1, only one first channel seal 154 is visible, however, it is noted that each tool 1101, 1102, 1103 may be provided with an associated first channel seal 154 disposed at a tool bay side of the tools 1101, 1102, 1103. The first channel seal 154 is arranged to seal at least a portion of a channel (see channel 160 in FIG. 2) defined by the first guide rail 140a and the second guide rail 140b.

In this embodiment, the sealing assembly 150 further comprises a second channel seal 152a disposed between the housing 102 and the tool mount 132. The second channel seal 152a may be coupled to a sealing assembly frame 103 (better shown in FIG. 9) and the tool mount 132. The sealing assembly frame 103 is disposed adjacent to a top portion of the housing 102. The second channel seal 152a expands or contracts based on a movement of the tool mount 132 relative to the housing 102. The second channel seal 152a will at least partially seal the channel 160 between the first guide rail 140a and the second guide rail 140b.

In the embodiment shown in FIG. 1, the sealing assembly 150 further comprises a first side seal 152b disposed between the housing 102 and the first guide rail 140a. In this embodiment, the first side seal 152b is coupled to the sealing assembly frame 103 (see also FIG. 9) and the first guide rail 140a. The first side seal 152b expands or contracts based on a movement of the first guide rail 140a along the Y-direction. The sealing assembly 150 further comprises a second side seal 152c disposed between the housing 102 and the second guide rail 140b. Specifically, the second side seal 152c is coupled to the sealing assembly frame 103 (shown in FIG. 9) and the second guide rail 140b. The second side seal 152c expands or contracts based on a movement of the second guide rail 140b along the Y-direction. Each of the first and second side seals 152b, 152c at least partially seals the build chamber 104 at the top of the build chamber 104.

In another embodiment, the sealing assembly frame 103 is absent, and an outer end of the second channel seal 152a, of the first side seal 152b and of the second side seal 152c, is coupled directly to the housing walls 108b, 108c, 108d, respectively.

In some embodiments, the seals 152a, 152b, 152c, 154 may comprise expandable bellows. As used there, the term "bellows" may refer to a non-planar sheet made of any material and arranged accordingly, that is to say having zigzag breaks. In other words, the non-planar sheet may comprise convolutions in a cross-sectional plane and is extensible/contractible along an axial direction. Alternatively, the seals 152a, 152b, 152c, 154 may comprise sheets made out of any suitable material (e.g., elastic material) that may at least partially seal the build chamber 104 by way of stretching or by rolling off/on a roller.

FIG. 2 schematically shows a perspective view of the additive manufacturing system 100 of FIG. 1 with some further elements removed for clarity reasons.

In this embodiment, the additive manufacturing system 100 comprises a build platform 106 on which one or more materials are dispensed by one or more of the plurality of tools 1101, 1102, 1103. Specifically, 3D printing of the 3D object/part is carried out on the build platform 106. In the illustrated embodiment of FIG. 2, the build platform 106 is substantially disposed along the X-Y plane and movable along the Z-direction. Thus, the 3D object being printed is indexed in a substantially vertical direction as the 3D object can be printed in a layer-by-layer manner using one or more of the plurality of tools 1101, 1102, 1103. Further, the build platform 106 may be movable along the Z-direction based on commands provided by a controller (not shown). The additive manufacturing system 100 may comprise a separate motor for moving the build platform 106 along the Z-direction.

In some embodiments, the tool mount 132 is arranged to move the first guide rail 140a and the second guide rail 140b at least along the Y-direction. Further, the tool mount 132 is slidable relative to the first guide rail 140a and the second guide rail 140b along the X-direction. Specifically, the tool mount 132 may slide between the first guide rail 140a and the second guide rail 140b for detachably coupling with one of the tools 1101, 1102, 1103. The tool mount 132 is arranged to move the selected tool 1102 between the first guide rail 140a and the second guide rail 140b at least along the X-direction.

In the embodiment of FIG. 2, the additive manufacturing system 100 further comprises a guide rod 142 extending along the Y-direction. The guide rod 142 may be supported by the housing 102. In the embodiment shown, the additive manufacturing system 100 further comprises a guide rail support 144 coupled to each of the first guide rail 140a and the second guide rail 140b, and slidably coupled to the guide rod 142. The guide rail support 144 allows movement of each of the first guide rail 140a and the second guide rail 140b relative to the guide rod 142 along the Y-direction. The guide rail support 144 will be discussed in more detail with reference to FIGS. 8A and 8B. The first guide rail 140a and the second guide rail 140b are supported on the guide rod 142 through the guide rail support 144 proximal to the first end 102a of the housing 102. At the opposite end, i.e., the second end 102b, the first guide rail 140a and the second guide rail 140b may be slidably arranged on a dedicated bar or on the sealing assembly frame 103 (better shown in FIG. 9).

The first guide rail 140a and the second guide rail 140b may be hollow and may comprise internal channels 172a, 172b (shown in FIGS. 8A and 8B) running along the X-direction. For example, the first and second guide rails 140a, 140b may have a cross-section which is substantially C-shaped. It should be understood that the design and configuration of the first guide rail 140a and the second guide rail 140b may vary based on application requirements.

In some embodiments, the first guide rail 140a and the second guide rail 140b are arranged to at least partially and slidably receive the selected tool 1102 therebetween. In some embodiments, the first and second guide rails 140a, 140b may comprise elongated U-profiles arranged to at least partially receive one of the first channel seals 154 (shown in FIG. 1) therebetween. It should be understood that the first and second guide rails 140a, 140b may comprise any other suitable configuration for slidably receiving the first channel seal 154 therebetween.

Figure 3:
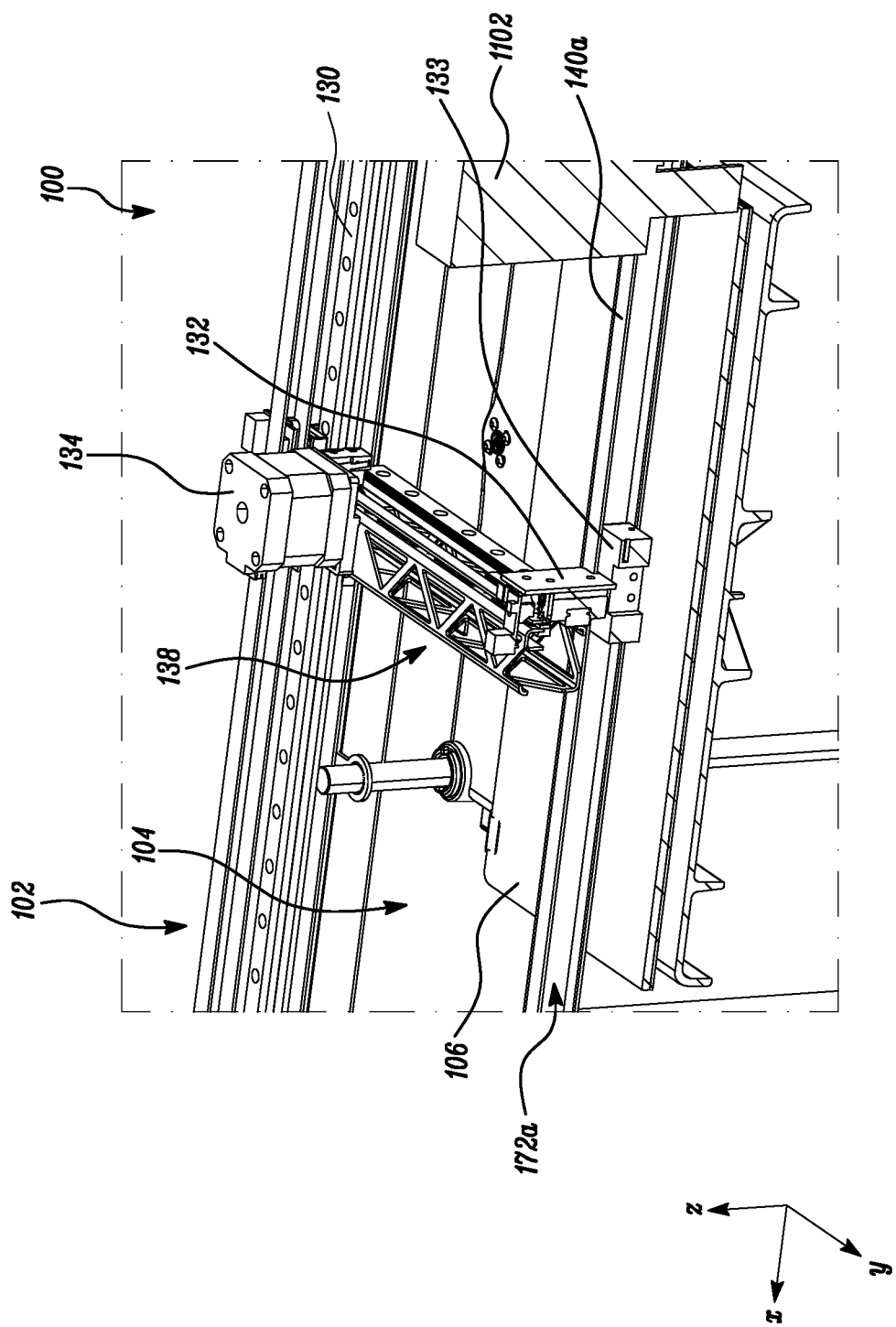
FIG. 3 schematically shows a detail of a longitudinal cross-sectional view of the additive manufacturing system of FIG. 1 taken along a line A-A' shown in FIG. 2.

FIG. 3 schematically shows a detail of a longitudinal cross-sectional view of the additive manufacturing system 100 taken along a line A-A' shown in FIG. 2. Some of the parts of the additive manufacturing system 100 are not shown for clarity. It is noted that in FIG. 3, the tool mount 132 and the cross-beam 138 are sliced through and only half of the tool mount 132 is shown.

In this example, the tool mount 132 comprises a push body 133 arranged between and in contact with the first guide rail 140a and the second guide rail 140b (not shown in FIG. 3), such that a movement of the tool mount 132 in the Y-direction causes a corresponding movement of each of the first guide rail 140a and the second guide rail 140b in the Y-direction. In other words, the tool mount 132 along with the push body 133 is arranged to move relative to the gantry or the cross-beam 138 in the Y-direction, thereby allowing movement of the first guide rail 140a and the second guide rail 140b in the Y-direction.

In some embodiments, the push body 133 may be integrally formed with the tool mount 132. Alternatively, the push body 133 may be coupled to the tool mount 132 through any suitable attachment mechanisms, for example, mechanical fasteners, welding, brazing, adhesives, and the like. In this embodiment, the first motor 134 is drivably coupled to the tool mount 132 through a belt drive. However, the first motor 134 may be drivably coupled to the tool mount 132 through any suitable driving mechanisms.

Figure 4B:
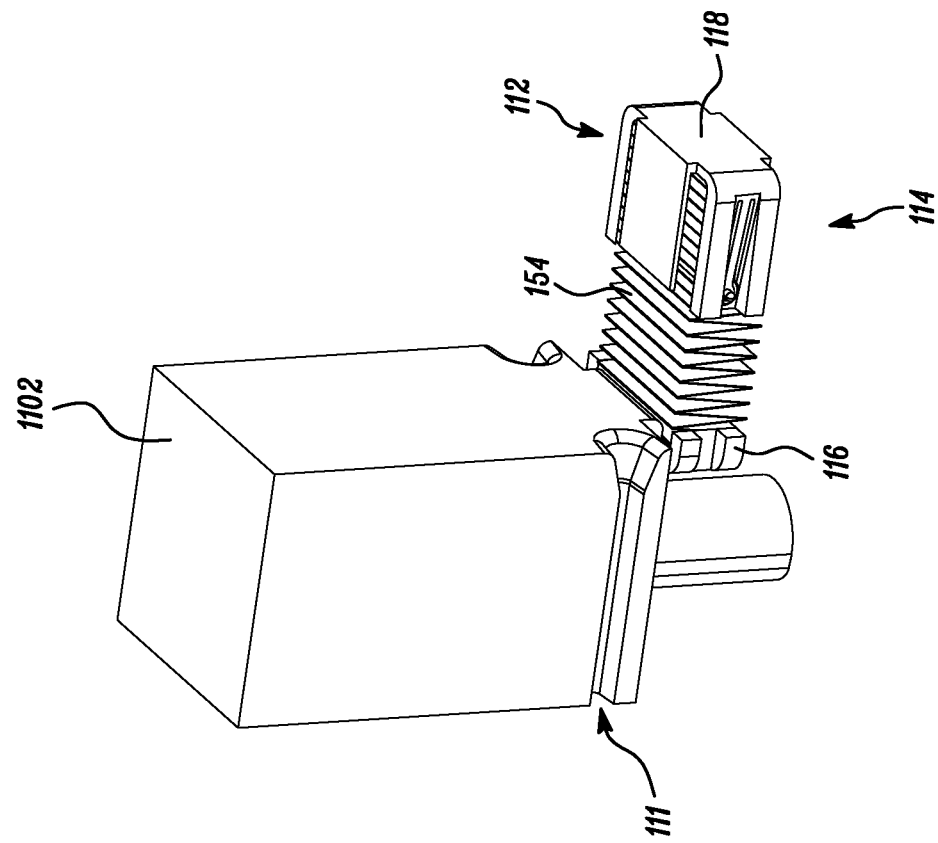
FIGS. 4A and 4B show schematic perspective views of a tool and a first channel seal in different states according to an embodiment of the present invention.
Figure 4A:
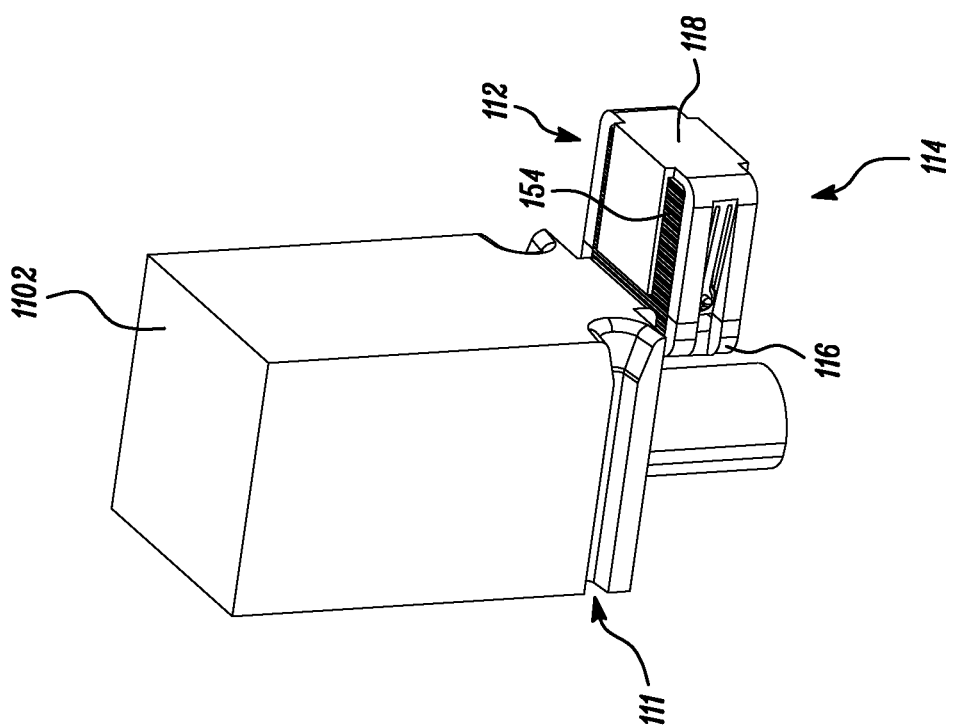

FIGS. 4A and 4B schematically show perspective views of the tool 1102 and the first channel seal 154. In this embodiment, the tool 1102 comprises two grooves 111 at both sides that allow the tool 1102 to slidably interact with ribs 124 in the tool bay 1202 (see also FIG. 6).

Referring now to FIG. 4A, the tool 1102 is coupled to the associated first channel seal 154. Each first channel seal 154 is arranged between the associated tool 1102 and one of the sliders 112.

The first channel seal 154 is arranged in a seal holder 114. The seal holder 114 is arranged to hold the associated first channel seal 154. The seal holder 114 comprises a first seal holder part 116 and a second seal holder part 118 detachably coupled to the first seal holder part 116. The first seal holder part 116 is coupled to the associated tool 1102. The first seal holder part 116 may be coupled to the associated tool 1102 through any suitable attachment mechanisms, for example, mechanical fasteners, welding, brazing, adhesives, and the like. In some other embodiments, the first seal holder part 116 may be integrally formed with the associated tool 1102. One outer end of the first channel seal 154 is coupled to the first seal holder part 116 and the other outer end of the first channel seal 154 is coupled to the second seal holder part 118. The coupling can be done through any suitable attachment mechanisms, for example, fasteners, adhesives, and/or the like. It is noted that the second seal holder part 118 functions as the slider 112 associated with the first channel seal 154.

In the example of FIGS. 4A and 4B, the first channel seal 154 comprises expandable bellows. The bellows may expand or contract based on external forces on the bellows. FIG. 4B shows an expanded state of the bellows.

Each first channel seal 154 expands or contracts based on a relative movement between the associated tool 1101, 1102, 1103 and the associated slider 112. In the example of FIGS. 4A and 4B, the first channel seal 154 expands or contracts based on a relative movement between the first seal holder part 116 and the second seal holder part 118.

Figure 5:
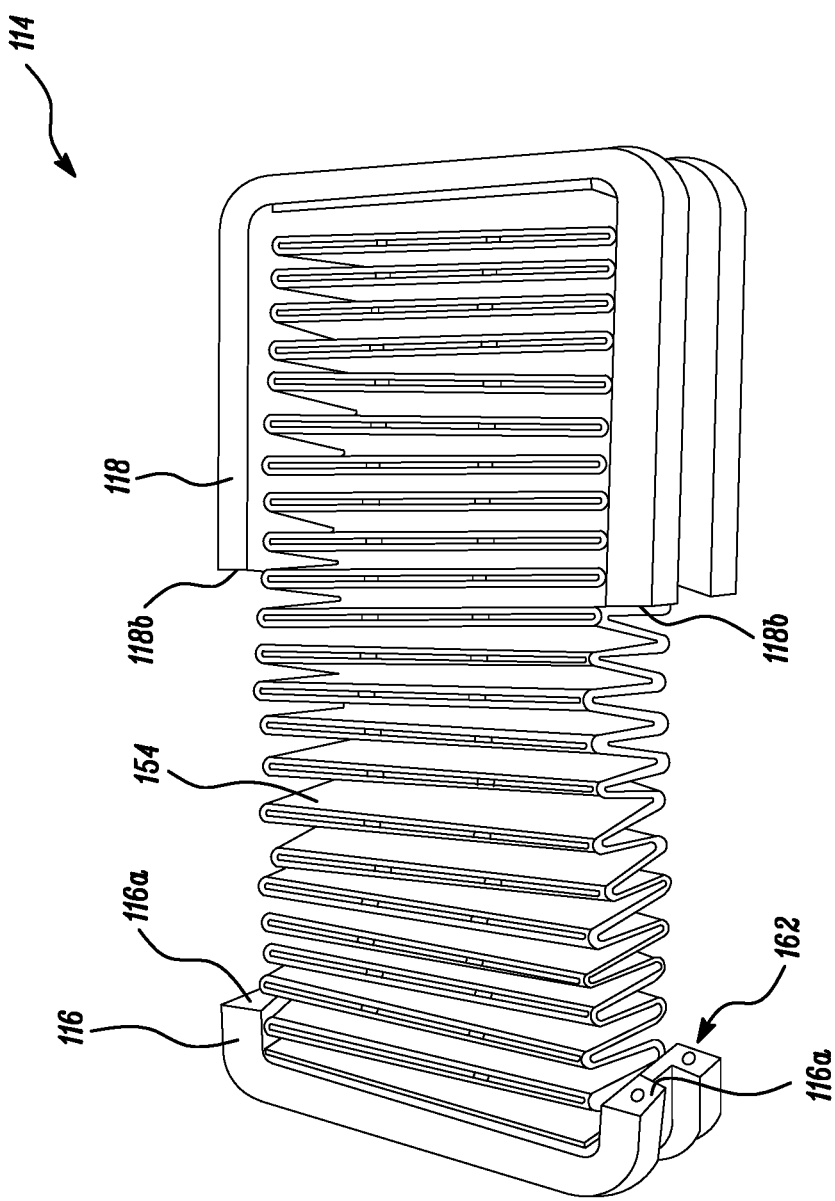
FIG. 5 schematically shows a perspective view of a seal holder in an uncoupled state according to an embodiment of the present invention.

FIG. 5 schematically shows an embodiment of the seal holder 114 and the first channel seal 154 in an expanded state. The second seal holder part 118 is detached from the first seal holder part 116. The second seal holder part 118 can be detachably coupled to the first seal holder part 116 via a magnetic coupling 162. The magnetic coupling 162 may hold the first seal holder part 116 and the second seal holder part 118 together when the associated tool 1102 is taken out of its tool bay 1202 (see also FIGS. 1 and 2).

In some embodiments, the magnetic coupling 162 comprises permanent magnets attached to corresponding coupling surfaces 116a, 118a of the first seal holder part 116 and the second seal holder part 118, respectively. It should be understood that the magnetic coupling 162 used for detachably coupling the first seal holder part 116 and the second seal holder part 118 is described by way of example only and any type of coupling may be used for detachably coupling the first seal holder part 116 and the second seal holder part 118 based on application requirements.

In the illustrated example of FIG. 5, the first seal holder part 116 and the second seal holder part 118 are substantially U-shaped elements. The shape of the first seal holder part 116 and the second seal holder part 118 may vary based on application requirements. It is further noted that the first seal holder part 116 is optional and the bellows (or other seals) could be connected directly onto the tool.

Figure 6:
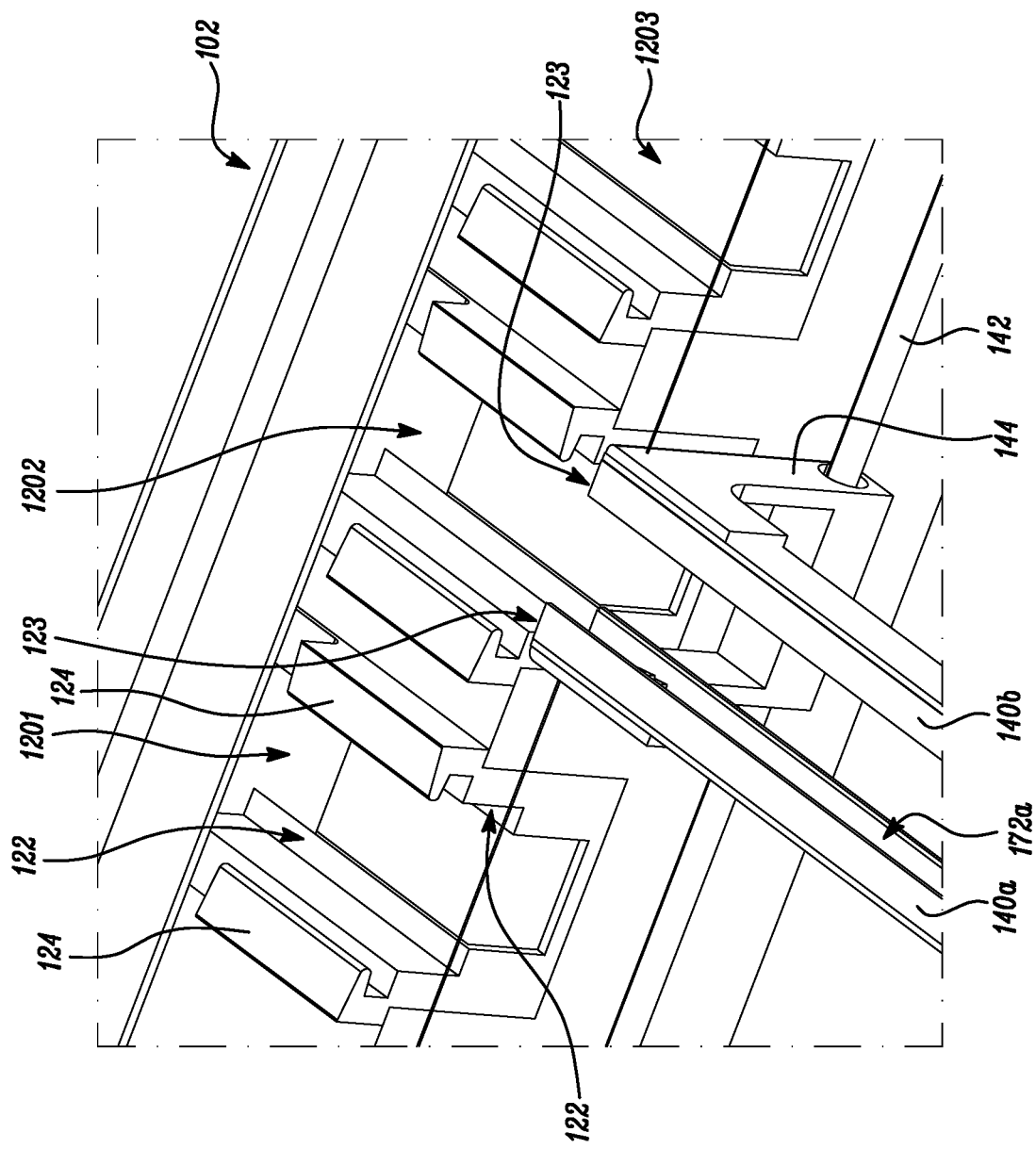
FIG. 6 schematically shows a detailed perspective view of first and second guide rails and a plurality of tool bays according to an embodiment of the present invention.

FIG. 6 schematically shows a detailed view of an outer end of the first and second guide rails 140a, 140b aligned with one of the plurality of tool bays, i.e., tool bay 1202.

Each of the first guide rail 140a and the second guide rail 140b is open at an end 123 proximal to the tool bay 1202, such that the seal holder 114 which leaves the tool bay 1202 together with the tool 1102 (see FIG. 4A) is able to slide from the tool bay 1202 between the first and second guide rails 140a, 140b. In other words, the seal holder 114 is arranged to slide in and out of the associated tool bay 1201, 1202, 1203.

In case of docking one of the tools 1101, 1102, 1103, the seal holder 114 will be received in a pair of grooves 122 of the respective tool bays 1201, 1202, 1203. A distance between the first guide rail 140a and the second guide rail 140b is such that the first guide rail 140a and the second guide rail 140b can both be aligned with the pair of grooves 122 of the tool bays 1201, 1202, 1203.

The first guide rail 140a and the second guide rail 140b are movable in the Y-direction depending on the movement of the tool mount 132 along the Y-direction. The first guide rail 140a and the second guide rail 140b may selectively be aligned with one of the plurality of tool bays 1201-1203 at a time and correspondingly receive the associated tool 1101, 1102, 1103 and the associated slider 112 therebetween. In case the tool 1101, 1102, 1103 is moved back to the associated tool bay 1201, 1202, 1203 by the gantry, the tool 1101, 1102, 1103 moves the associated slider 112 into the associated tool bay 1201, 1202, 1203 together with the associated first channel seal 154 (see also FIGS. 1, 4A and 4B).

Figure 7B:
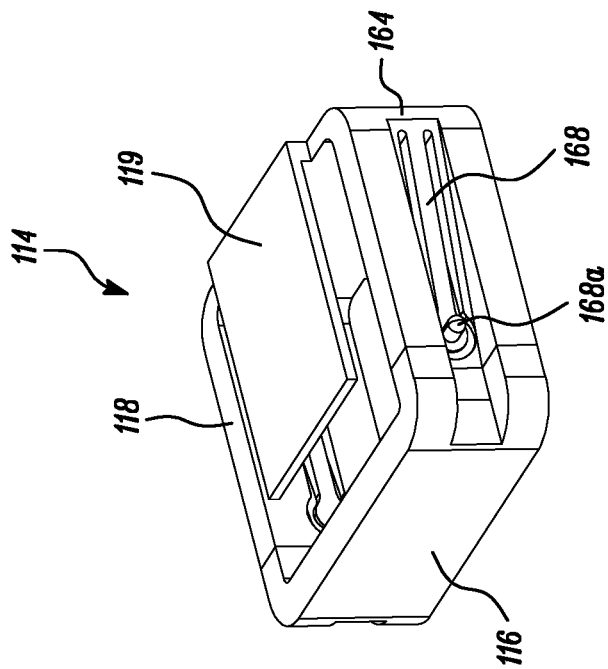
FIGS. 7A and 7B schematically show two perspective views of the seal holder according to an embodiment of the present invention.
Figure 7A:
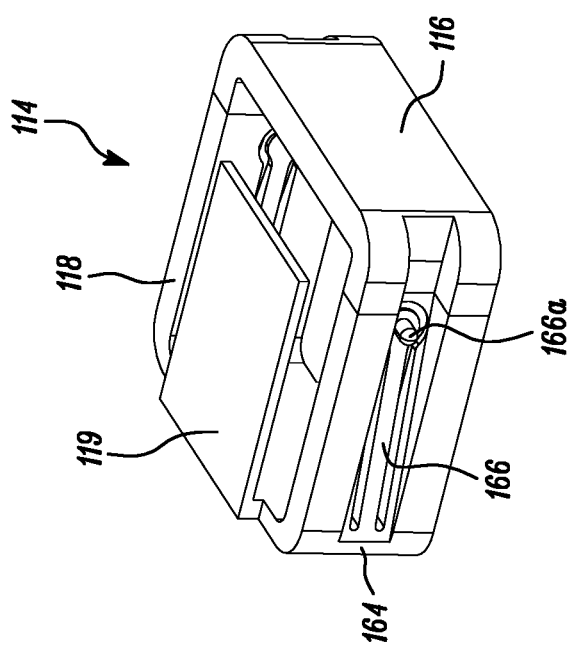

FIGS. 7A and 7B schematically show two perspective views of the seal holder 114 according to an embodiment. The seal holder 114 comprises the first seal holder part 116 and the second seal holder part 118. The second seal holder part 118 comprises an optional roof plate 119 (and a bottom plate, which is not visible here) arranged to further enclose the bellow (i.e. the first channel seal 154), which may be practical in case the seal holder 114 is taken out of the additive manufacturing system 100 (shown in FIGS. 1 and 2). The second seal holder part 118 further comprises a first resilient member 166 (shown in FIG. 7A) and a second resilient member 168 (shown in FIG. 7B) inclined inwardly towards each other relative to the first and second guide rails 140a, 140b (shown in FIGS. 1, 2 and 6). The first resilient member 166 and the second resilient member 168 extend from a rear portion 164 of the second seal holder part 118. The first resilient member 166 and the second resilient member 168 are elastic and arranged to be movable inwardly with respect to the first and second guide rails 140a, 140b.

The second seal holder part 118 further comprises a first protrusion 166a (shown in FIG. 7A) extending from the first resilient member 166 and a second protrusion 168a (shown in FIG. 7B) extending from the second resilient member 168. The first and second protrusions 166a, 168a are arranged at ends of the first and second resilient members 166, 168, respectively. Specifically, the first and second protrusions 166a, 168a are disposed at the ends that are distal to the rear portion 164 of the second seal holder part 118. Further, the first and second protrusions 166a, 168a extend outwardly from the first and second resilient members 166, 168 towards the first and second guide rails 140a, 140b.

Figures 8A, 8B:
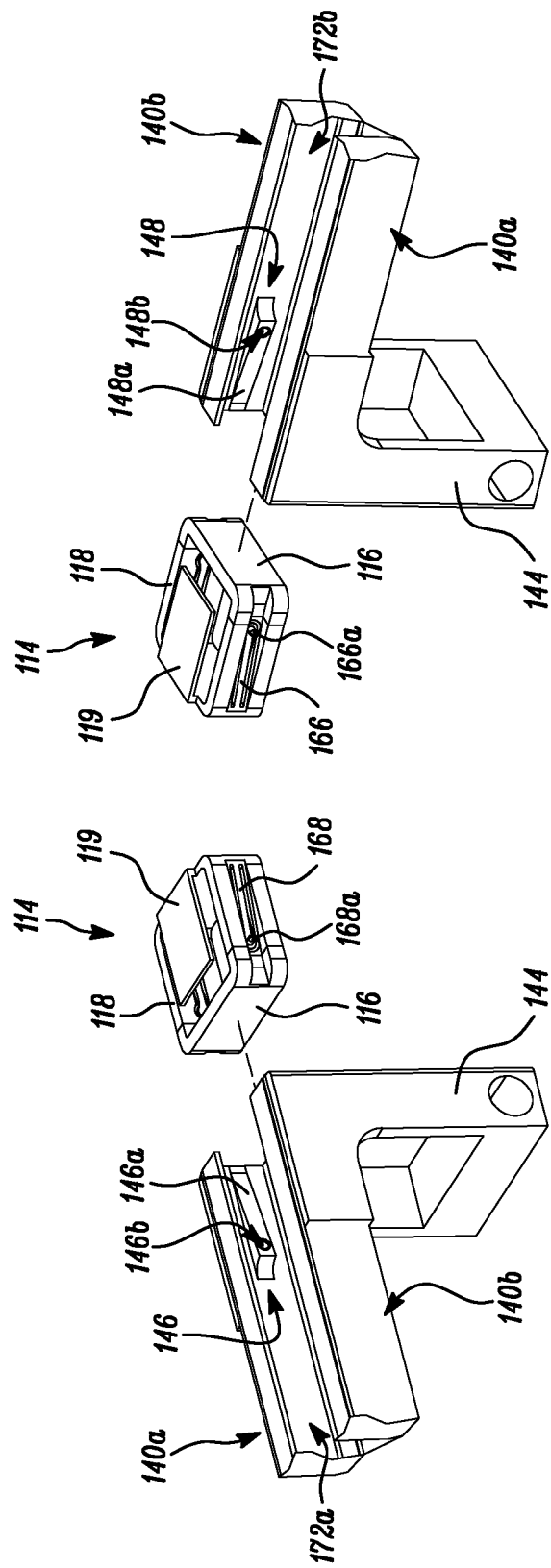
FIGS. 8A and 8B schematically show two perspective views of the first and second guide rails and the seal holder according to an embodiment of the present invention.

FIGS. 8A and 8B schematically show two perspective views of an outer end of the first and second guide rails 140a, 140b and the seal holder 114 according to an embodiment. In this embodiment, the first guide rail 140a comprises a first stopper 146 (shown in FIG. 8A) and the second guide rail 140b comprises a second stopper 148 (shown in FIG.

8B). The first and second stoppers 146, 148 are disposed in internal channels 172*a*, 172*b* of the first guide rail 140*a* and the second guide rail 140*b*, respectively. As can be seen, the first and second stoppers 146, 148 are positioned at the outer ends of the first and second guide rails 140*a*, 140*b* at the tool bay side. At this outer end, the guide rail support 144 supports both guide rails 140*a*, 140*b*. The guide rail support 144 comprises a through hole at the bottom end for receiving the guide rod 142 shown in FIG. 6. This allows movement of each of the first guide rail 140*a* and the second guide rail 140*b* relative to the guide rod 142 along the Y-direction. The guide rail support 144 has a substantially U-shaped form in the Y-Z plane so as to allow passage of the tools.

In some embodiments, the first stopper 146 of the first guide rail 140*a* comprises a first wedge member 146*a* (shown in FIG. 8A) and the second stopper 148 of the second guide rail 140*b* comprises a second wedge member 148*a* (shown in FIG. 8B) inclined inwardly towards each other relative to the first and second guide rails 140*a*, 140*b*. In some embodiments, a vertical height of each of the first wedge member 146*a* and the second wedge member 148*a* increases with an increase in distance from the tool bay side. In some embodiments, the first wedge member 146*a* comprises a first aperture 146*b* (shown in FIG. 8A) and the second wedge member 148*a* comprises a second aperture 148*b* (shown in FIG. 8B).

The first and second guide rails 140*a*, 140*b* are arranged to slidably receive the tools 1101, 112, 1103 and the associated seal holder 114 therebetween. The first and second stoppers 146, 148 are arranged to allow the first seal holder part 116 to pass therebetween while restricting the movement of the second seal holder part 118 therebetween, such that when the tool 1101, 1102, 1103 together with the first seal holder part 116 moves away from the tool bay 1201, 1202, 1203, the first seal holder part 116 uncouples from the second seal holder part 118 which causes the first channel seal 154 (see also FIGS. 1, 2, 4A and 4B) to expand and cover at least a part of the channel 160 (shown in FIG. 2), and thus, a part of the build chamber 104.

In some embodiments, the first wedge member 146*a* (shown in FIG. 8A) is configured to engage with the first resilient member 166 (shown in FIG. 8B) and the second wedge member 148*a* (shown in FIG. 8B) is configured to engage with the second resilient member 168 (shown in FIG. 8A). Specifically, the first wedge member 146*a* (shown in FIG. 8A) is configured to engage with the first protrusion 166*a* of the first resilient member 166 (shown in FIG. 8B) and the second wedge member 148*a* (shown in FIG. 8B) is configured to engage with the second protrusion 168*a* of the second resilient member 168 (shown in FIG. 8A). The first aperture 146*b* (shown in FIG. 8A) is configured to removably and at least partially receive the first protrusion 166*a* (shown in FIG. 8B) therein to detachably couple the second seal holder part 118 to the first guide rail 140*a*. The second aperture 148*b* (shown in FIG. 8B) is configured to removably and at least partially receive the second protrusion 168*a* (shown in FIG. 8A) therein to detachably couple the second seal holder part 118 to the second guide rail 140*b*.

As the tool 1101, 1102, 1103 moves away from the tool bay 1201, 1202, 1203, the first and second protrusions 166*a*, 168*a* of the first and second resilient members 166, 168 engage with the first and second wedge members 146*a*, 148*a* and correspondingly allow the first and second resilient members 166, 168 to move inwardly relative to the first and second guide rails 140*a*, 140*b* until the first and second protrusions 166*a*, 168*a* are at least partially received within the first and second apertures 146*b*, 148*b*, respectively.

Thus, the first and second stoppers 146, 148 restrict further movement of the second seal holder part 118 away from the tool bay 1201, 1202, 1203, thereby uncoupling the second seal holder part 118 from the first seal holder part 116. Further, the first channel seal 154 expands with the movement of the tool 1101, 1102, 1103 and the first seal holder part 116 away from the tool bay 1201, 1202, 1203 since the second seal holder part 118 is detachably coupled to the first and second guide rails 140*a*, 140*b*. Specifically, the first channel seal 154 may expand as a relative distance between the first and second seal holder parts 116, 118 increases and the second seal holder part 118 is detachably retained by the first and second stoppers 146, 148. Further, a degree of expansion of the first channel seal 154 may increase as a distance between the tool 1101, 1102, 1103 and the tool bay 1201, 1202, 1203 increases.

Figure 9:
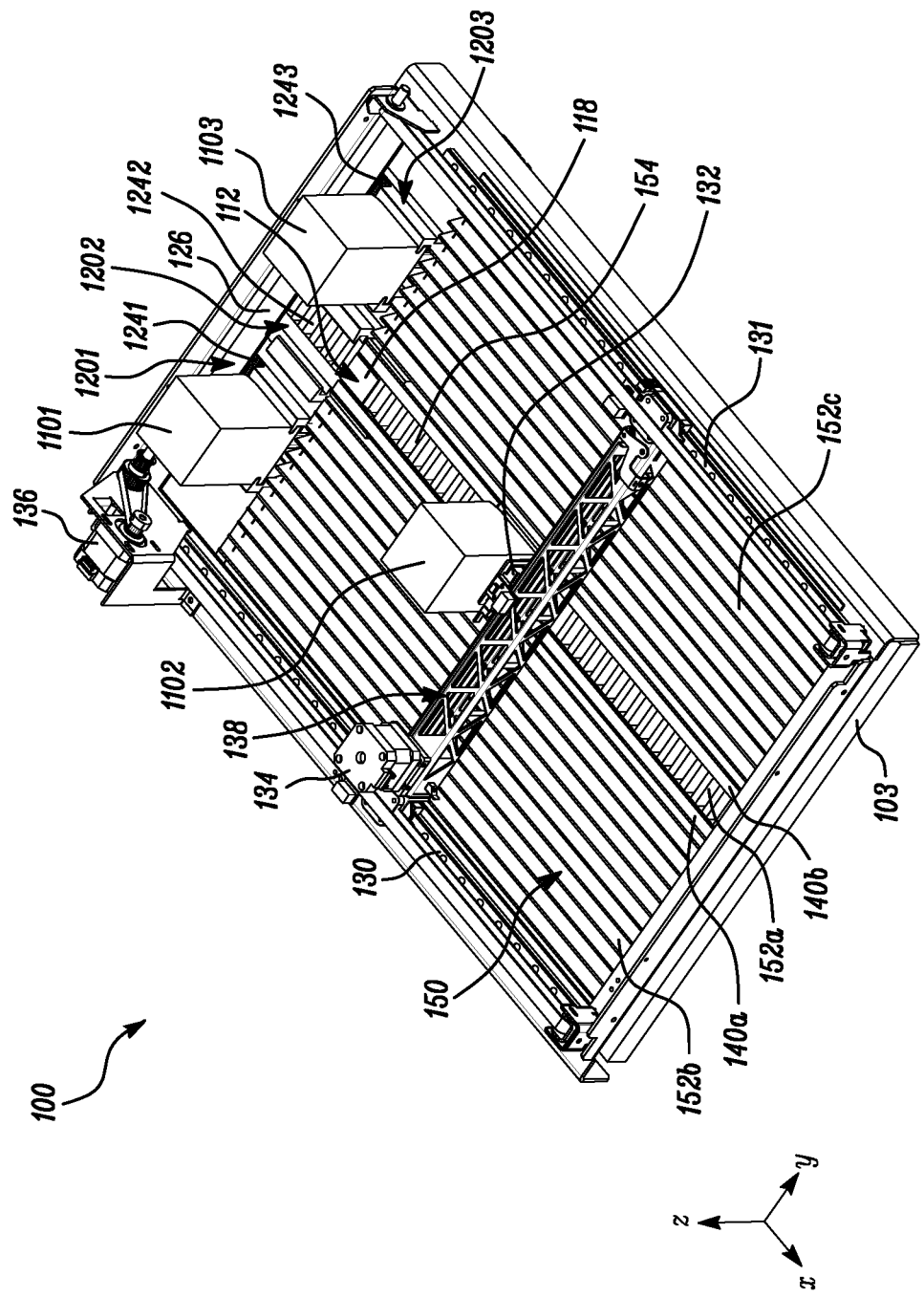
FIG. 9 schematically shows a perspective view of a part of the additive manufacturing system of FIG. 1.

FIG. 9 schematically shows a part of the additive manufacturing system 100 of FIG. 1. Most of the parts shown in FIG. 9 are already discussed with reference to FIGS. 1 and 2. As can be seen in FIG. 9, in this embodiment, the second channel seal 152*a* is arranged between the sealing assembly frame 103 and the tool mount 132. The second channel seal 152*a* may be coupled to the sealing assembly frame 103 and the push body 133 of the tool mount 132 (see also FIG. 3) through any suitable coupling mechanisms. The second channel seal 152*a* is at least partially received between the first guide rail 140*a* and the second guide rail 140*b*.

It is noted that the second channel seal 152*a* is preferred but may be absent in which case the build chamber 104 is not fully sealed. Since the channel 160 is relatively small as compared to the width of the build chamber, the non-sealed part of the channel 160 will define an opening that may be acceptable in terms of isolation requirements.

The sealing assembly frame 103 may be a rectangular frame arranged within the housing of the additive manufacturing system 100 at an appropriate level so as to support the seals 152*a*, 152*b*, 152*c*, 154 at the outside of the sealing assembly 150. An advantage of the seals being arranged in a frame, such as frame 103, is that it makes assembly of the additive manufacturing system 100 easier.

FIG. 9 also shows that the additive manufacturing system 100 comprises a plurality of bay seals 1241, 1242, 1243 associated with the plurality of tools 1101, 1102, 1103. Each bay seal 1241, 1242, 1243 is arranged between the associated slider 112 and a frame 126 of the associated tool bay 1201, 1202, 1203. Each bay seal 1241, 1242, 1243 expands or contracts based on a movement of the associated slider 112 relative to the associated tool bay 1201, 1202, 1203. Further, each bay seal 1241, 1242, 1243 is arranged to seal at least a part of the build chamber 104. The frame 126 of the tool bay 1201, 1202, 1203 may be a part of the sealing assembly frame 103. Each bay seal 1241, 1242, 1243 is arranged to seal the associated tool bay 1201, 1202, 1203 after the associated tool 1101, 1102, 1103 has been removed from the associated tool bay 1201, 1202, 1203. In FIG. 9, the tool 1102 has been removed from its tool bay 1202 and the bay seal 1242 is sealing the empty tool bay 1202. The other bay seals 1241 and 1243 are pressed behind the respective tools 1101 and 1103 together with the first channel seals (not visible in FIG. 9). By arranging a seal to seal off an empty tool bay, no heated air or gasses can escape through the tool bay 1201, 1202, 1203, resulting in an improved sealing of the build chamber 104.

Figure 10:
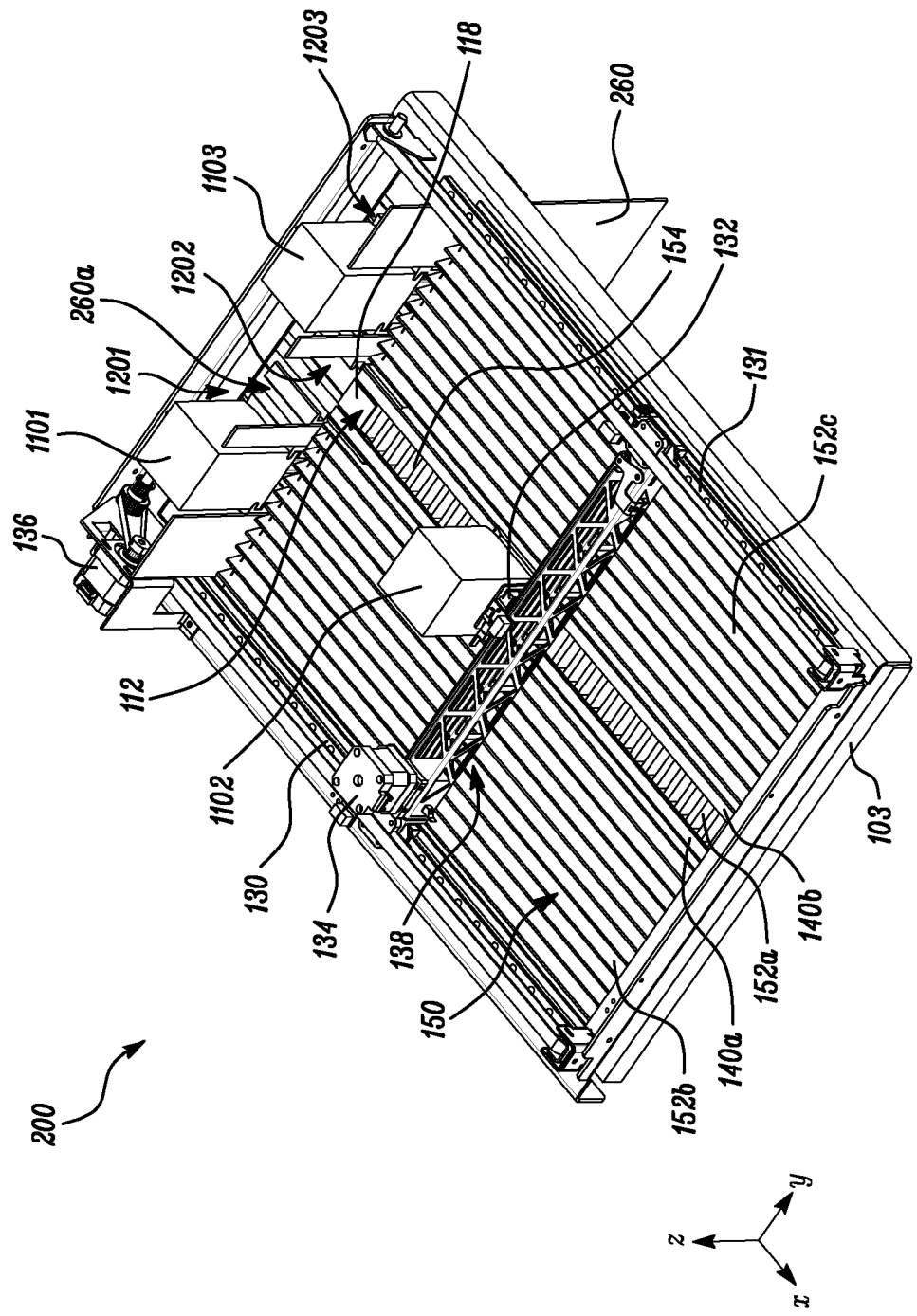
FIG. 10 schematically shows a perspective view of a part of an additive manufacturing system according to another embodiment.

FIG. 10 schematically shows a part of the additive manufacturing system 200 according to a further embodiment.

The additive manufacturing system 200 comprises the same elements as described above with reference to FIGS.

1, 2 and 9 but without the bay seals 1241, 1242, 1243. Thus, empty tool bays 1201,1202, 1203 are not sealed by any seal. Instead, the additive manufacturing system 200 comprises a chamber wall 260 disposed adjacent to the tool bays 1201, 1202, 1203. The chamber wall 260 may be a vertical wall substantially perpendicular to the X-direction. In this embodiment, the chamber wall 260 separates the plurality of tool bays 1201, 1202, 1203 from the build chamber 104. The chamber wall 260 is configured to at least partially seal the build chamber 104. In this embodiment, the chamber wall 260 comprises a plurality of openings 260a through which the tools 1101,1102, 1103 can pass. Each opening 260a is aligned with the associated tool bay 1201, 1202, 1203 to allow the associated tool 1101, 1102, 1103 to be removed from the associated tool bay 1201, 1202, 1203.

Figure 11:
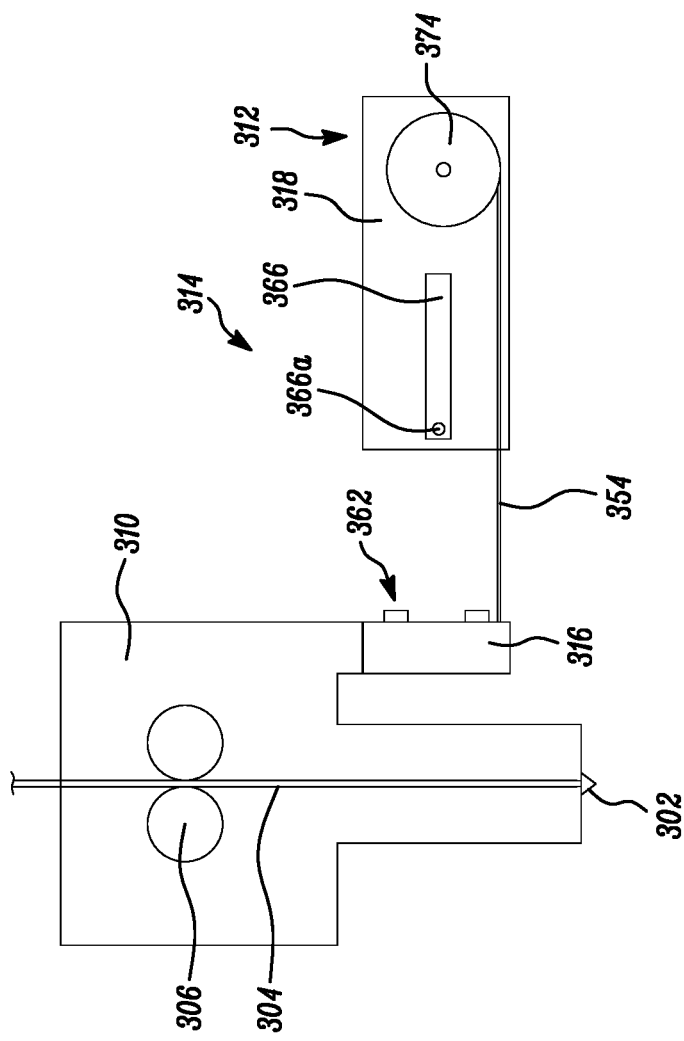
FIG. 11 schematically shows a side view of a tool according to a further embodiment of the present invention.

FIG. 11 schematically shows a side view of a tool 310 according to a further embodiment of the present invention. The tool 310 may be similar to the tools 1101, 1102, 1103 described above. A first channel seal 354 is arranged between the tool 310 and a slider 312 associated with the first channel seal 354. The first channel seal 354 expands or contracts based on a relative movement between the tool 310 and the slider 312. The slider 312 may be a part of a seal holder 314 comprising a first seal holder part 316 and a second seal holder part 318 detachably coupled to the first seal holder part 316. In this embodiment, the second seal holder part 318 comprises a first resilient member 366 and a second resilient member (not shown) inclined inwardly towards each other. The first resilient member 366 comprises a first protrusion 366a. Similarly, the second resilient member comprises a second protrusion (not shown). The second seal holder part 318 is detachably coupled to the first seal holder part 316 via a magnetic coupling 362.

In the illustrated embodiment of FIG. 11, the first channel seal 354 is a flexible sheet which is at least partly foldable on a roller 374. The roller 374 may be spring biased to allow the first channel seal 354 to be wound on the roller 374 as the first channel seal 354 contracts based on a movement of the first seal holder part 316 towards the second seal holder part 318. Further, the first channel seal 354 may unwound from the roller 374 as the first seal holder part 316 moves away from the second seal holder part 318. It is noted that some of the seals mentioned above may comprise bellows while others may comprise sheet that may be rolled onto accompanying rollers as shown in FIG. 11.

The tool 310 further comprises a nozzle 302 through which a thermoplastic material (e.g., a polymer) may be dispensed. The tool 310 may comprise one or more extruders (not shown) that receive a consumable material 304 through feeder wheels 306, and subsequently melt the consumable material 304 to be dispensed through the nozzle 302.

The present invention has been described above with reference to a number of exemplary embodiments as shown in the drawings. Modifications and alternative implementations of some parts or elements are possible and are included in the scope of protection as defined in the appended claims. It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. An additive manufacturing system comprising:
   a housing;
   a build chamber;
   a plurality of tools;
   a plurality of tool bays associated with the plurality of tools, wherein each tool bay is arranged to store one tool from the plurality of tools;
   a gantry arranged to select one tool from the plurality of tools, wherein the gantry removes the selected tool from the associated tool bay and moves the selected tool in a plane above the build chamber;
   a tool mount slidably arranged on the gantry wherein the tool mount is arranged to detachably couple the selected tool to the gantry;
   two parallel guide rails extending in a first direction and defining a channel therebetween, wherein the guide rails are arranged to at least partially and slidably receive the selected tool from one of the tool bays, wherein the two guide rails are movable along a second direction perpendicular to the first direction, so as to enable alignment of the guide rails with one of the tool bays at a time, and
   a sealing assembly for sealing the build chamber at a top of the build chamber, the sealing assembly comprising:
      a plurality of sliders each being slidably arranged in one of the tool bays;
      a plurality of first channel seals wherein each first channel seal is arranged between one of the tools and one of the sliders, wherein each first channel seal expands or contracts based on a relative movement between the associated tool and the associated slider, and wherein, in case the selected tool is moved back to the associated tool bay by the gantry, the selected tool moves the associated slider into the associated tool bay together with the associated first channel seal;
      a first side seal arranged between the housing and the first guide rail, and
      a second side seal arranged between the housing and the second guide rail.

2. The additive manufacturing system according to claim 1, wherein at least one of the first channel seals comprises expandable bellows.

3. The additive manufacturing system according to claim 1, wherein the tool mount comprises a push body arranged between and in contact with the first guide rail and the second guide rail, such that a movement of the tool mount in the second direction causes a corresponding movement of each of the first guide rail and the second guide rail in the second direction.

4. The additive manufacturing system according to claim 1, further comprising:
   a guide rod extending along the second direction; and
   a guide rail support coupled to each of the first guide rail and the second guide rail, and slidably coupled to the guide rod.

5. The additive manufacturing system according to claim 1, wherein a distance between the first guide rail and the second guide rail is such that the first guide rail and the second guide rail are arranged to be aligned with a pair of grooves in each of the tool bays, and wherein the associated slider is arranged to slide in and out of the associated tool bay.

6. The additive manufacturing system according to claim 1, further comprising a plurality of seal holders for holding one of the first channel seals, each seal holder comprising a first seal holder part and a second seal holder part detachably coupled to the first seal holder part, wherein each first channel seal is arranged in an associated seal holder, wherein the first seal holder part is coupled to the associated tool, and wherein the second seal holder part functions as the slider associated with the first channel seal.

7. The additive manufacturing system according to claim 6, wherein the second seal holder part is detachably coupled to the first seal holder part via a magnetic coupling.

8. The additive manufacturing system according to claim 6, wherein the first guide rail comprises a first stopper and the second guide rail comprises a second stopper, the first and second stoppers being disposed adjacent to the plurality of tool bays, wherein the first and second stoppers are arranged to allow the first seal holder part to pass therebetween while restricting the movement of the second seal holder part therebetween, such that when the tool together with the first seal holder part moves away from the tool bay, the first seal holder part uncouples from the second seal holder part to allow the first channel seal to expand and cover at least a part of the build chamber.

9. The additive manufacturing system according to claim 8, wherein:
the second seal holder part comprises a first resilient member and a second resilient member inclined inwardly towards each other relative to the first and second guide rails, a first protrusion extending from the first resilient member, and a second protrusion extending from the second resilient member;
the first stopper of the first guide rail comprises a first wedge member and the second stopper of the second guide rail comprises a second wedge member inclined inwardly towards each other relative to the first and second guide rails, the first wedge member comprising a first aperture, and the second wedge member comprising a second aperture;
the first wedge member is configured to engage with the first resilient member and the second wedge member is configured to engage with the second resilient member;
the first aperture is configured to removably and at least partially receive the first protrusion therein to detachably couple the second seal holder part to the first guide rail; and
the second aperture is configured to removably and at least partially receive the second protrusion therein to detachably couple the second seal holder part to the second guide rail.

10. The additive manufacturing system according to claim 1, further comprising a plurality of bay seals, each bay seal being arranged between one of the sliders and a frame of the associated tool bay, wherein each bay seal expands or contracts based on a movement of the associated slider relative to the associated tool bay, and wherein each bay seal at least partially seals the build chamber.

\* \* \* \* \*